W. A. McKAY.
APPARATUS FOR SEALING CANS.
APPLICATION FILED OCT. 30, 1909.

998,542.

Patented July 18, 1911.

WITNESSES:
M. L. McNeil
Frank D. Bentley

INVENTOR
William A. McKay
BY
Attorney

UNITED STATES PATENT OFFICE.

WILLIAM A. McKAY, OF TACOMA, WASHINGTON, ASSIGNOR OF ONE-TENTH TO J. S. LEWIS, OF TACOMA, WASHINGTON.

APPARATUS FOR SEALING CANS.

998,542. Specification of Letters Patent. Patented July 18, 1911.

Application filed October 30, 1909. Serial No. 525,476.

*To all whom it may concern:*

Be it known that I, WILLIAM A. McKAY, a citizen of Canada, residing at Tacoma, in the county of Pierce and State of Washington, have invented certain new and useful Improvements in Apparatus for Sealing Cans, of which the following is a specification, reference being had therein to the accompanying drawing.

This invention relates to the sealing of bottles, jars, cans and other receptacles for preserving food. etc., and has for its objects to provide an improved cover to a vessel whereby a flat top is attained, and which is sufficiently flexible to allow it to make a close connection with the vessel, and which will not rise off the vessel when the air is being exhausted a sufficient distance to displace it therefrom.

A further object of my invention is to provide a hand device for exhausting the air from the vessel.

I attain these and other objects by the devices illustrated in the accompanying drawing, in which—

Figure 1:
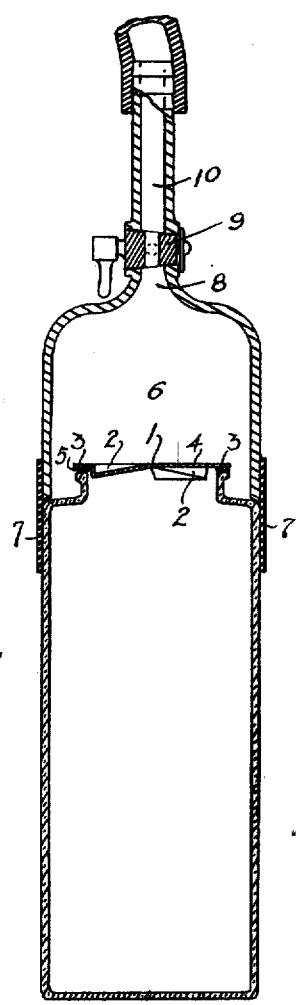
Figure 2:
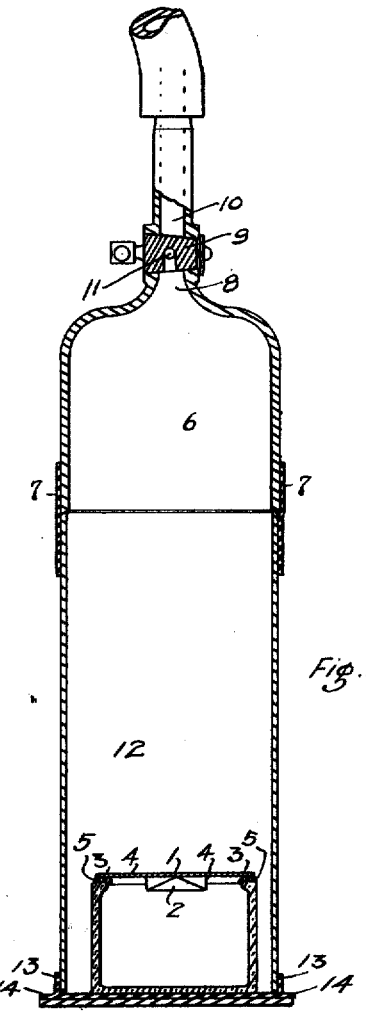
Figure 3:
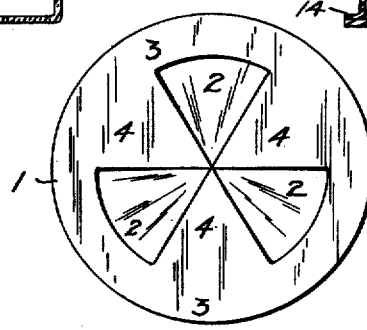

Figure 1 is a vertical cross-section showing my device sealing a large jar; Fig. 2 is a similar view showing a small jar sealed and ready for removal; and Fig. 3 is a plan of my improved cover.

Similar numerals of reference refer to similar parts throughout the several views.

My invention is adapted to work on any form of bottle. jar. can or other receptacle and does not require the formation thereon of any screw threads, grooves, or flanges.

The cover 1 is preferably made of pressed metal and is flat in general form but has three triangular depressions 2 extending from the center to a point near the rim 3, said depressions being deepest at the rim and tapering upward toward the center of the cover at which point the depressions merge with the plane intermediate parts 4. The diameter of the depressions is preferably slightly less than the orifice of the vessel so that the said depressions will enter the orifice a short distance. A soft rubber ring 5 is slipped on the under side of the cover 1 around the said depressions 2 therein, said ring being adapted to engage the vessel around the orifice thereof and being interposed between the vessel and the rim 3 of the cover. It is evident that when the air pressure above the cover 1 is reduced below that of the air within the vessel, that the cover will be very slightly lifted by the air therein and yet will be held in place on the vessel by the depressions 2, until the pressures are substantially equal, and that when the cover is thus raised the air may pass from within the vessel between the depressions 2, that is, under the intermediate flat parts 4, and has a straight horizontal passage out of the vessel. It is also evident that if the air above the cover 1 is greater than inside the vessel that this outside pressure will hold the cover down on the vessel and will press it firmly on the rubber ring 5 thus preventing air from leaking into the jar. This form of cover has many advantages over those in which the entire center is offset out of the plane of the rim, among which may be mentioned that the cover is more flexible and thus will accommodate itself to the variations in the vessel orifice, and that the air being exhausted does not have to turn corners and find an uncertain way out but has a straight broad course open to it and it will therefore lift the cover but a very slight degree, and that since the bodies of the covers are flat they allow the vessels to be packed one above the other with greater security and take up less space than they otherwise would.

In order to draw the air from the vessel I use a cup 6 having an open bottom, outwardly beveled, of substantially the same diameter as the vessel to which it is applied. Around the outside of the lower rim of this cup 6 is secured a band of soft rubber 7 which extends beyond the cup and is adapted to engage the sides of the vessel to seal the connection between the top of the vessel and the cup 6 to prevent air from being drawn into the cup at the said joint. An exhaust passage 8 leads into the cup 6 and has a three-way valve 9 therein. This valve is adapted to control the connection of the cup 6 with either the air pump passage 10 or with the outside air through the passage 11. (In Fig. 1 the valve is shown connecting the cup to the pump passage, and in Fig. 2 to the outside air passage.) It is evident that if the cup is placed on the vessel and the rubber band 7 is slipped over the joint therebetween, and that if the valve 9 is turned to connect the cup 6 with the exhausting passage 10, then the air will be exhausted from the cup and from the vessel and the outer air will press inward on the rubber band 7 at the joint; but that, as soon as the pressure has reached the desired point of exhaustion, and if the valve 9 is turned so as to connect the cup 6 with the passage 11, then the outside air will rush into the cup and will force the cover 1 on the vessel and will hold it there and will at the same time relieve the pressure on the rubber band 7 so that it may be readily removed from the vessel. If, however, the vessel is small in size then it may be exhausted by the above means in conjunction with the following additional devices. A cylinder 12 which fits the cup 6, is open at both ends, one end being preferably beveled off to fit the bevel of the bottom edge of the cup 6. The other end of the cylinder 12 fits in the rubber ring 13 formed on the rubber base piece 14 which is adapted to hold the small jar or bottle to be sealed. When the air is drawn out of the cup 6 it removes it from the cylinder 12 and from the jar therein, and the pressure of the outer air on the rings or bands 7 and 13 prevents any leak therethrough.

It is evident that a vessel once sealed by my device will remain sealed until the cover is forced off therefrom and that, should only a portion of the contents of the vessel be used, the vessel may be immediately resealed and the remaining contents preserved for further use. This feature makes my invention very desirable for household use as well as for the preserving of prepared paints and other articles.

Many changes in form could be made in my invention without departing from the spirit thereof and I therefore do not wish to confine myself to the particular shapes, proportions, sizes, etc., as herein shown and described, but I wish to cover any such changes which do not depart from the spirit of my invention.

Having described my invention what I claim is:—

In a device of the class described, the combination of an exhaust chamber open at the bottom and adapted to engage with its lower edge the upper edge of the walls of a vessel from which the air is to be exhausted, the walls of the vessel and the chamber forming substantially a continuous surface; and a rubber band engaging the outer sides of the walls of said chamber and extending downward below the lower edge thereof and adapted to engage the outer sides of the walls of the vessel from which the air is to be exhausted and thus to pass across the joint between the vessel and the chamber whereby when the air pressure is reduced within the chamber the rubber band is drawn into the said joint at any place where the contact is imperfect.

In testimony whereof I affix my signature in presence of two witnesses.

WILLIAM A. McKAY.

Witnesses:
GEO. G. WILLIAMSON,
RONALD AUBRY.

---

Copies of this patent may be obtained for five cents each, by addressing the "Commissioner of Patents, Washington, D. C."